US012303928B2

(12) United States Patent
Becker et al.

(10) Patent No.: US 12,303,928 B2
(45) Date of Patent: May 20, 2025

(54) LOW PROFILE AIRLESS SPRAY GUN FOR APPLYING PAINTS

(71) Applicant: Graco Minnesota Inc., Minneapolis, MN (US)

(72) Inventors: Steven D. Becker, Inver Grove Heights, MN (US); Dale C. Pemberton, Big Lake, MN (US)

(73) Assignee: Graco Minnesota Inc., Minneapolis, MN (US)

(*) Notice: Subject to any disclaimer, the term of this patent is extended or adjusted under 35 U.S.C. 154(b) by 80 days.

(21) Appl. No.: 17/043,839

(22) PCT Filed: Apr. 23, 2019

(86) PCT No.: PCT/US2019/028676

§ 371 (c)(1),
(2) Date: Sep. 30, 2020

(87) PCT Pub. No.: WO2019/209801

PCT Pub. Date: Oct. 31, 2019

(65) Prior Publication Data

US 2021/0046492 A1 Feb. 18, 2021

Related U.S. Application Data

(60) Provisional application No. 62/661,883, filed on Apr. 24, 2018.

(51) Int. Cl.

*B05B 9/01* (2006.01)
*B05B 12/00* (2018.01)
(Continued)

(52) U.S. Cl.

CPC .............. *B05B 9/01* (2013.01); *B05B 12/002* (2013.01); *B05B 15/63* (2018.02); *B05B 15/16* (2018.02)

(58) Field of Classification Search

CPC ......... B05B 9/01; B05B 15/63; B05B 12/002; B05B 7/1209; B05B 15/60; B05B 7/2478;
(Continued)

(56) References Cited

U.S. PATENT DOCUMENTS

| | | | |
|---|---|---|---|
| 1,085,472 | A | 1/1914 | Parker |
| 1,425,333 | A | 8/1922 | Parker et al. |

(Continued)

FOREIGN PATENT DOCUMENTS

| | | |
|---|---|---|
| CN | 2907914 Y | 6/2007 |
| CN | 2930880 Y | 8/2007 |

(Continued)

OTHER PUBLICATIONS

IInternational Preliminary Report on Patentability for PCT Application No. PCT/US2019/028676, Dated Oct. 27, 2020, pp. 9.

(Continued)

*Primary Examiner* — Tuongminh N Pham
*Assistant Examiner* — Juan C Barrera
(74) *Attorney, Agent, or Firm* — Kinney & Lange, P.A.

(57) ABSTRACT

This disclosure concerns a paint spray gun and a method of handling the spray gun with one hand. The gun comprises a body comprising a valve, a trigger actuatable to open and close the valve, a handle, and a guard having a top end and a bottom end, the top end attached to the body and the bottom end located below the trigger. The trigger is located directly between the guard and the handle. When gripped, the thump of the hand wraps around one side of the handle, the index and middle fingers of the hand wrap around the other side of the handle above the bottom end of the guard to contact the trigger, and the ring and little fingers of the hand are below the bottom of the guard. The trigger is actuated with only the index and middle fingers pulling the trigger to open the valve.

11 Claims, 7 Drawing Sheets

(51) Int. Cl.
*B05B 15/63* (2018.01)
*B05B 15/16* (2018.01)

(58) Field of Classification Search
CPC ....... B05B 7/2402; B05B 7/02; B05B 9/0894; A01M 7/0046; B05D 1/02
USPC .......................................................... 239/526
See application file for complete search history.

(56) References Cited

U.S. PATENT DOCUMENTS

| | | | | |
|---|---|---|---|---|
| 3,187,950 | A | 6/1965 | Lange | |
| 3,708,123 | A | 1/1973 | Kreuger | |
| 3,844,487 | A | 10/1974 | Malec | |
| 4,020,990 | A | 5/1977 | Luff | |
| 4,606,501 | A | 8/1986 | Bate et al. | |
| 5,236,129 | A * | 8/1993 | Grime | B05B 7/1272 239/289 |
| 6,669,114 | B1 | 12/2003 | Williams et al. | |
| 7,568,637 | B2 | 8/2009 | Hornsby et al. | |
| 8,272,621 | B2 | 9/2012 | Finstad et al. | |
| 8,979,001 | B2 | 3/2015 | Peterson et al. | |
| 8,985,397 | B2 | 3/2015 | Lord | |
| 2007/0186813 | A1 * | 8/2007 | Smith | B05B 7/24 524/60 |
| 2008/0296410 | A1 * | 12/2008 | Carey | B05B 15/40 29/890.07 |
| 2011/0297756 | A1 | 12/2011 | Peterson et al. | |
| 2013/0233945 | A1 | 9/2013 | Andersen | |
| 2018/0111142 | A1 | 4/2018 | Joaquim et al. | |

FOREIGN PATENT DOCUMENTS

| | | | |
|---|---|---|---|
| CN | 201543537 | U | 8/2010 |
| CN | 102773183 | A | 11/2012 |
| CN | 102824977 | A | 12/2012 |
| CN | 202893575 | | 4/2013 |
| CN | 202893575 | U | 4/2013 |
| CN | 203196800 | U | 9/2013 |
| CN | 206104206 | U | 4/2017 |
| CN | 107223075 | A | 9/2017 |
| GB | 2096491 | A | 10/1982 |
| JP | 1996266956 | | 10/1996 |
| JP | H08266956 | A | 10/1996 |

OTHER PUBLICATIONS

First Chinese Office Action for CN Application No. 201980026972.9, Dated Aug. 23, 2021, pp. 21.

First Chinese Office Action for CN Application No. 202210804652.5, Dated Apr. 14, 2023, pp. 21.

International Preliminary Report on Patentability for PCT Application No. PCT/US2019/028676, Dated Oct. 27, 2020, pp. 9.

Second Chinese Office Action for CN Application No. 202210804652.5, Dated Jul. 22, 2023, pp. 13.

Third Chinese Office Action for CN Application No. 202210804652.5, Dated Dec. 7, 2023, pp. 13.

Fourth Chinese Office Action for CN Application No. 202210804652.5, Dated Mar. 15, 2024, pp. 13.

* cited by examiner

LOW PROFILE AIRLESS SPRAY GUN FOR APPLYING PAINTS

FIELD OF THE INVENTION

This invention concerns guns for airless spraying of coatings such as paints and stains.

BACKGROUND

Airless spray guns are used to apply paint to surfaces such as walls and ceilings. A piston pump pulls the paint from a reservoir, such as a bucket, and outputs the paint through a hose under pressure. The pressure on the paint in the hose, downstream from the pump, can be 1,000-5,000 pounds per square inch. Paint under such pressure can atomize into a desired spray pattern when released through a small metal orifice for spaying the paint onto a surface. Such a process is referred to as airless painting because pressurized air is not used to atomize or otherwise propel the air. The paint is directed in the spray pattern by a gun which carries the small metal orifice as a nozzle. The gun is held by a hand of the operator to direct the spray pattern along the surface being painted.

A conventional airless spray gun has a trigger that is actuated by four fingers (index, middle, ring, and little fingers) while the thumb wraps around the opposite side of the gun as the four fingers. Such guns are typically large and can suffer from high weight and low maneuverability which can frustrate making precise painting maneuvers with the hand.

SUMMARY

Various embodiments concern a gun for spraying paint supplied to the gun from a hose under pressure. The gun comprises a body containing a valve, the opening of the valve releasing paint from the body and the closing of the valve stopping the release of paint from the body. The gun further comprises a trigger actuatable to open and close the valve, a handle configured to be gripped by one hand for using the gun, and a guard having a top end and a bottom end, the top end attached to the body, the bottom end of the guard located below the trigger, the trigger located directly between the guard and the handle. The guard only allows the thump of the hand to wrap around one side of the handle and only two fingers of the hand to wrap around the other side of the handle above the bottom end of the guard to actuate the trigger, the other two fingers of the hand being below the bottom of the guard.

Various embodiments concern a method of handling a gun for spraying paint supplied to the gun from a hose under pressure. The method comprises gripping a gun with one hand, the gun comprising: a body comprising a valve, a trigger actuatable to open and close the valve, a handle, and a guard having a top end and a bottom end, the guard attached to the body at the top end of the guard, the bottom end of the guard located below the trigger, the trigger located directly between the guard and the handle. When gripping, the thump of the hand wraps around one side of the handle, the index and middle fingers of the hand wrap around the other side of the handle above the bottom end of the guard to contact the trigger, and the ring and little fingers of the hand are below the bottom of the guard. The method further comprises actuating the trigger with only the index and middle fingers pulling the trigger, the actuation of the trigger opening the valve to allow the release paint as a spray from the body.

The scope of this disclosure is not limited to this summary. Further inventive aspects are presented in the drawings and elsewhere in this specification and in the claims.

This disclosure makes use of multiple embodiments and examples to demonstrate various inventive aspects. The presentation of the featured embodiments and examples should be understood as demonstrating a number of open-ended combinable options and not restricted embodiments. Changes can be made in form and detail to the various embodiments and features without departing from the spirit and scope of the invention.

DETAILED DESCRIPTION

This disclosure concerns a spray gun configured to be small, lightweight, and easily maneuverable while maintaining the functionality of a conventional, large spray gun. The systems of this disclosure can be used for spraying paints, stains, and other coatings. While paint will be used herein as an exemplar, it will be understood that this is merely one example and that other solutions (e.g., water, oil, solvents, etc.) can be sprayed instead of paint.

Figure 1:
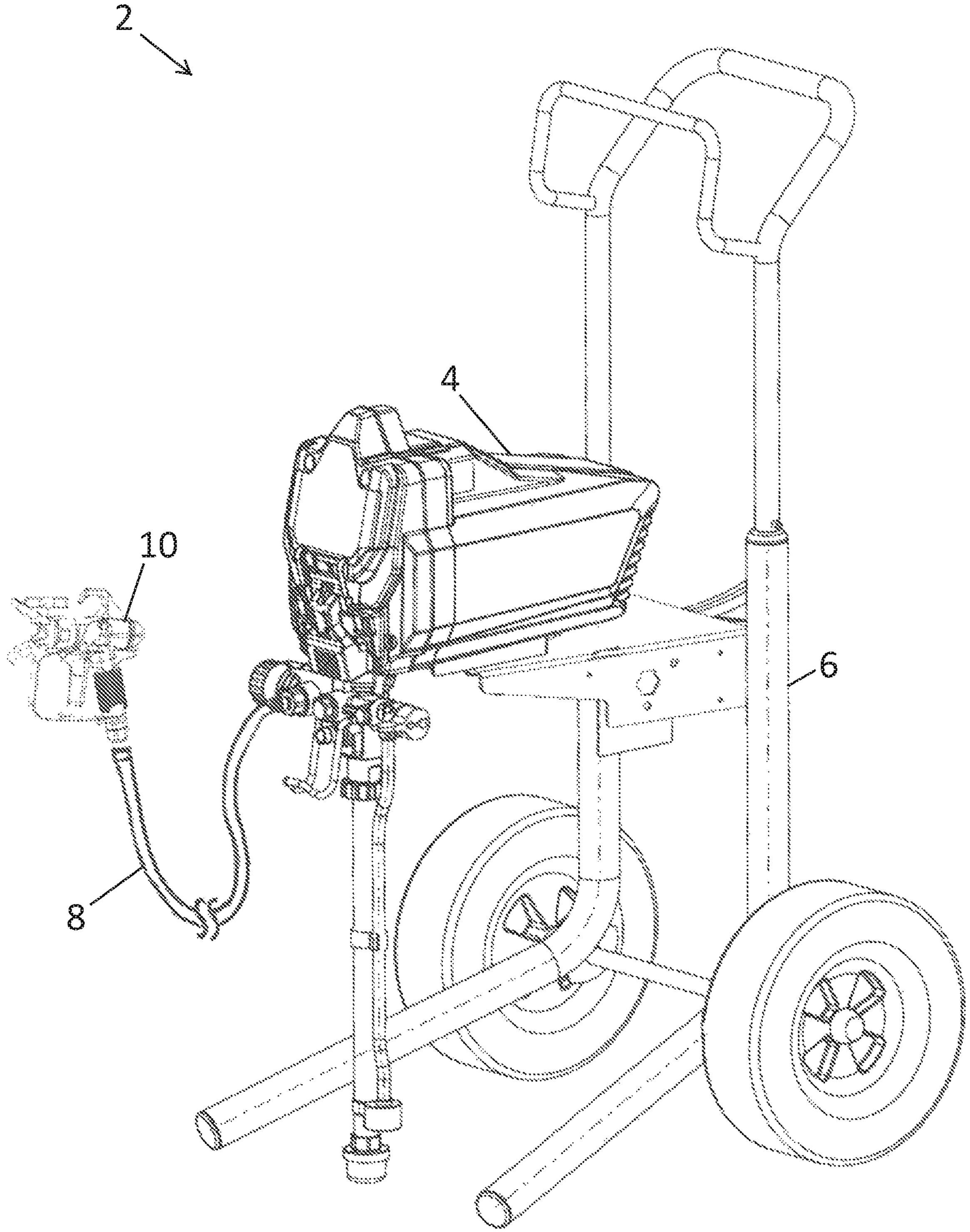
FIG. 1 is a perspective view of a sprayer including a gun.

FIG. 1 is a perspective view of a sprayer 2. The sprayer 2 can be operated to spray paint. The sprayer 2 includes a motor housing 4 mounted on a frame 6. The motor housing 6 contains an electric motor (not illustrated) for driving a piston pump as is known in the art. The paint travels through the pump and then through the hose 8, under pressure, and then out from the gun 10.

Figure 2:
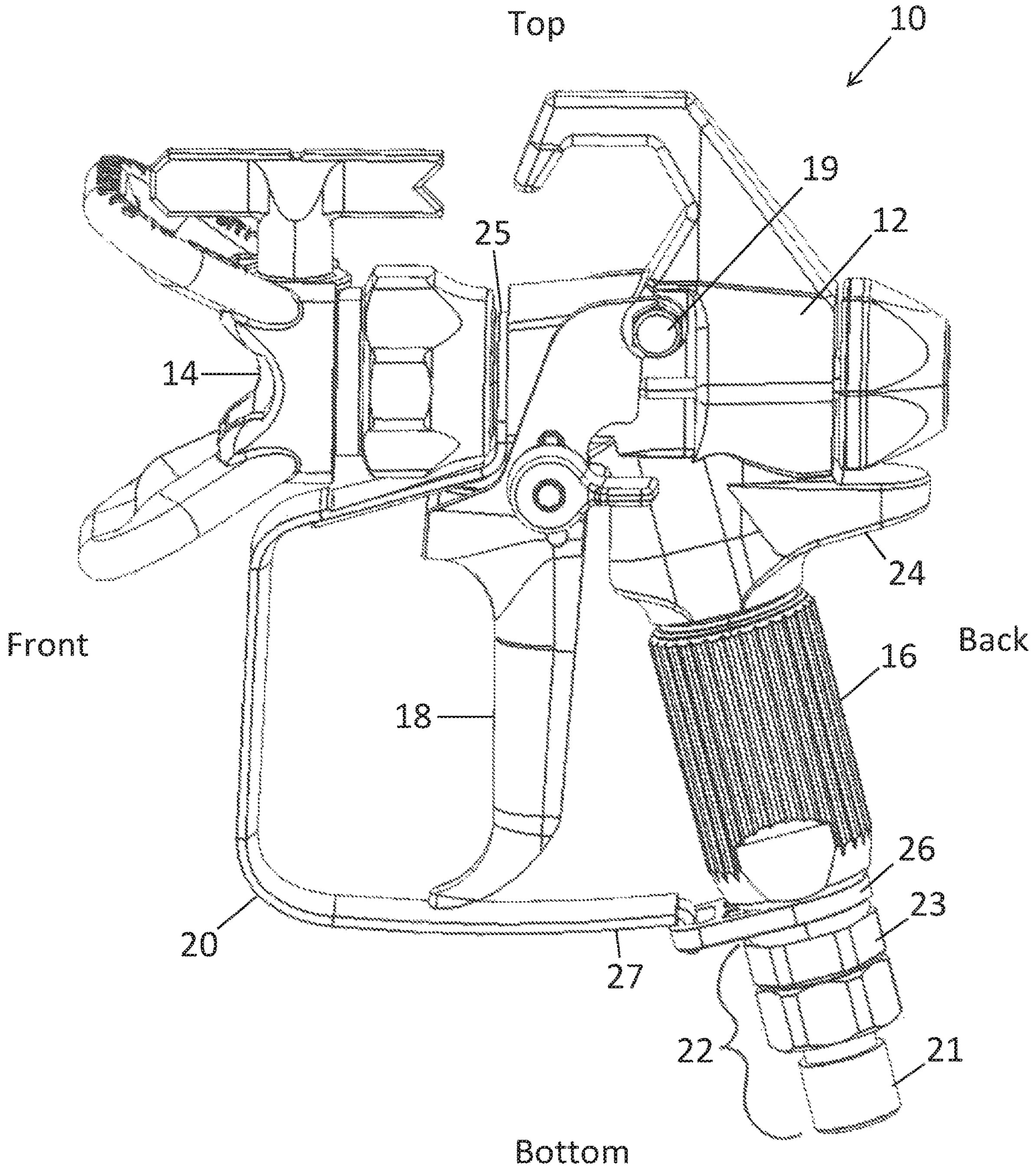
FIG. 2 is a side view of the gun.

FIG. 2 is a side view of the gun 10. Relative directions of up, down, front, and back are indicated in FIG. 2. Along these orientations, up can correspond to an above orientation, down can correspond to a below or bottom orientation, front can correspond to forward orientation, and back can correspond to a rear or behind orientation. The gun 10 includes a body 12, a nozzle 14, a handle 16, a trigger 18, a guard 20, a retainer 26, and a connector 22. The handle 16 and the connector 22 together form a stem which extends downward from the body 12. As will be shown, the stem is gripped by a hand for holding the gun 10 while the guard 20 positions the fingers of the hand.

The guard 20 has a top end 25 and a bottom end 27. The top end 25 is attached to the body 12. The top end 25 is located behind the nozzle 14. The guard 20 connects to the body 12 and extends downward to connect to the bottom of the handle 16, above the retainer 26. The top end 25 is shown as attached to the body 12 by wrapping entirely around a portion of the body 12. The top end 25 could alternatively be attached to the body 12 by a weld or fastener. The bottom end 27 of the guard 20 is attached to the stem. More specifically in the embodiment shown, the bottom end 27 of the guard 20 is attached to the gun 10 below the handle 16. In the illustrated embodiment, the bottom end 27 of the guard 20 is attached to the stem by a retainer 26. The guard 20 hooks into an aperture of the retainer 26 to hold the guard 20 in place along the full length of the trigger 18. The retainer 26 includes a ring portion which wraps entirely around the stem, such as by wrapping around either the handle 16 or the coupling 23. In some embodiments, the retainer 26 can contact the bottom side of the handle 16. In some embodiments, the retainer 26 can be sandwiched between the handle 16 and the connector 22.

In some alternative embodiments, the bottom end 27 of the guard 20 is attached to the stem (e.g., at the handle 16, at the connector 22, or between the handle 16 and the connector 22) directly and the retainer 26 is omitted. In such a case, the bottom end 27 of the guard 20 can wrap entirely around the stem, be welded to the stem, or be connected to the stem via a fastener. In the illustrated embodiment, the bottom end 27 of the guard 20 is attached to the retainer 26. Specifically in the illustrated embodiment, the guard 20 hooks into the retainer 26.

The connector 22 detachably connects with the downstream end of hose 8. The connector 22 includes an optional swivel to allow rotation between the hose 8 and the gun 10. The connector 22 includes a fitting 21 to connect with a complementary fitting on the hose 8. The fitting 21 can be threaded or be of a quick disconnect-type, as examples. The connector 22 further includes a coupling 23 which extends into the handle 16 to connect the handle 16 to the connector 22.

The trigger 18 is located directly between the guard 20 and the handle 16. Specifically, the guard 20 is in front of the trigger 16 and the handle 16 is behind the trigger 18. A middle portion of the guard 20, between the top end 25 and the bottom end 27, extends along the trigger 18 in an up-down orientation but spaced from, and parallel with, the trigger 18. The top end 25 of the guard 20 is above the trigger 18, or at least above the concave or indented portion along the trigger 18. The bottom end 27 of the guard 20 is below the trigger 18.

In the illustrated embodiment, the connector 22 is located below the bottom end 27 of the guard 20 and the retainer 26. In some embodiments, such a connector 22 does not protrude below the retainer 26, handle 16, and/or the guard 20. For example, the bottom of the handle 16 can include a cavity which receives the downstream end of the hose 8.

After passing through the coupling 23 from the hose 8, the paint travels within the gun 10 through a passageway within the handle 16 and then into the body 12. The body 12 contains a valve which is actuated by the trigger 18. Specifically, the valve is closed in a nominal state to prevent release of paint from the nozzle 14 when the trigger 18 is not pulled. Pulling the trigger 18 opens the valve to release paint from the nozzle 14, typically in an atomized spray fan. The trigger 18 is attached to the body 12 by a hinge 19 which extends through the body 19. The trigger 18 pivots about the hinge 19 to move and actuate the valve within the body 12.

The body 12 includes a stop 24 on the back side of the body 12. As shown, the stop 24 projects backward from the body 12. The stop 24 is curved to match the shape of the top or upper portion of the hand between the thumb and the index finger. The stop 24 contacts this portion of the hand and prevents the hand from moving past the stop 24 to inhibit the gun 10 from slipping downward from the grip of the user.

The trigger 18 pivots about the body 12 to open and close the valve. The guard 20 extends along and in front of the trigger 18 to prevent unintentional actuation of the trigger 18. The trigger 18 extends almost the full length between the top end 25 and the bottom ends 27 of the guard 20. The length of the trigger 18 within this guard 20 space is longer than the handle 16.

The handle 16 has an outer surface which serves as a hand grip for the gun 10, particularly the palm. As shown, the handle 16 has texturing to improve the grip surface of the handle 16. The handle 16 further has an inner cavity which either serves as a fluid passageway for the paint or contains another component which serves as the conduit for the paint. In the illustrated embodiment, a metal tube serves as the exterior portion of the handle 16 and optionally the inner conduit which the paint contacts as the paint flows from the connector 22, through the handle 16, and to the body 12.

Figure 3:
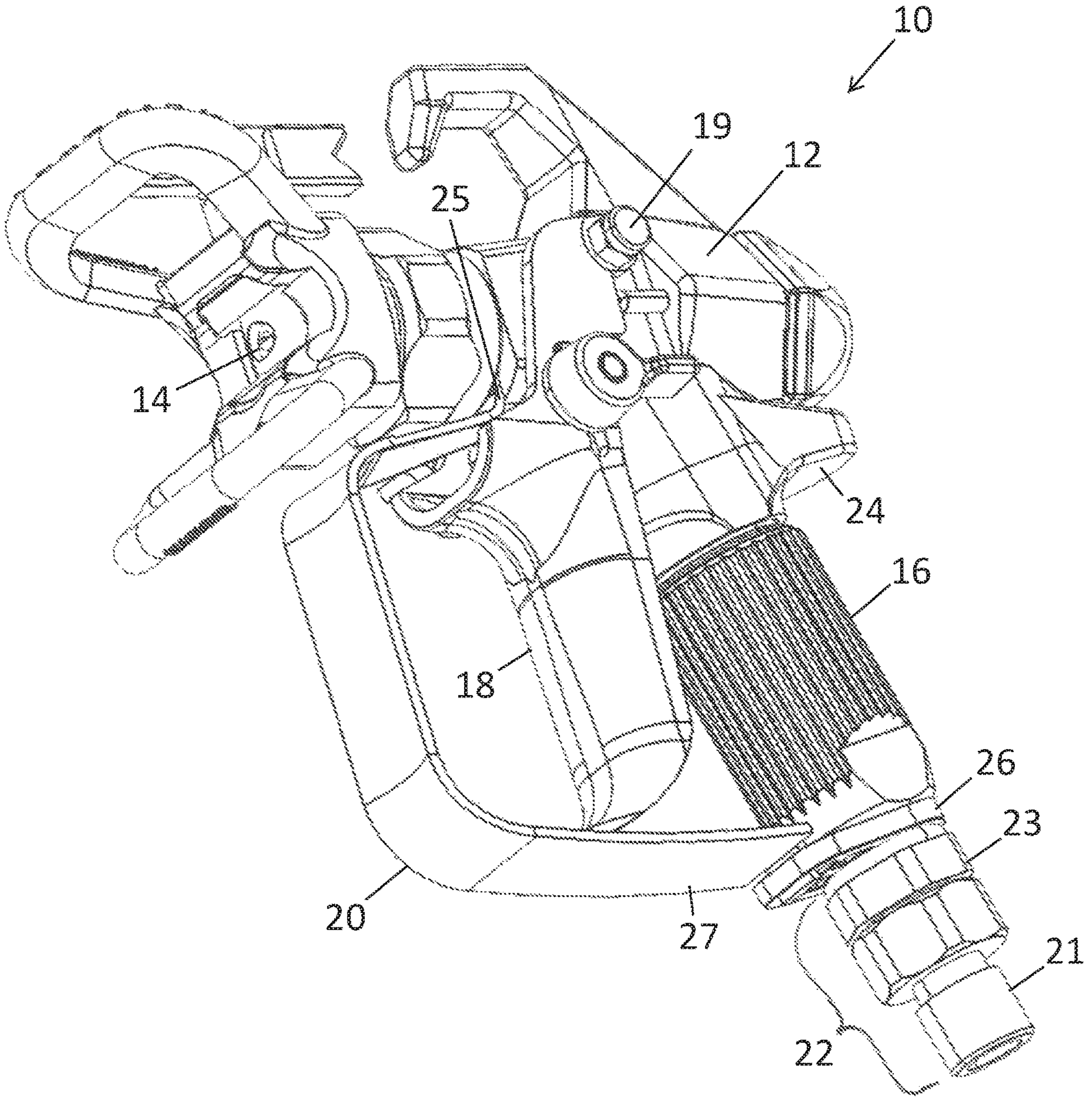
FIG. 3 is a perspective view of the gun.

FIG. 3 is another side view of the gun 10 but from a different angle relative to FIG. 2 to show down-facing portions of the gun 10 including how the bottom end of the guard 20 hooks into an aperture in the retainer 26.

Figure 4:
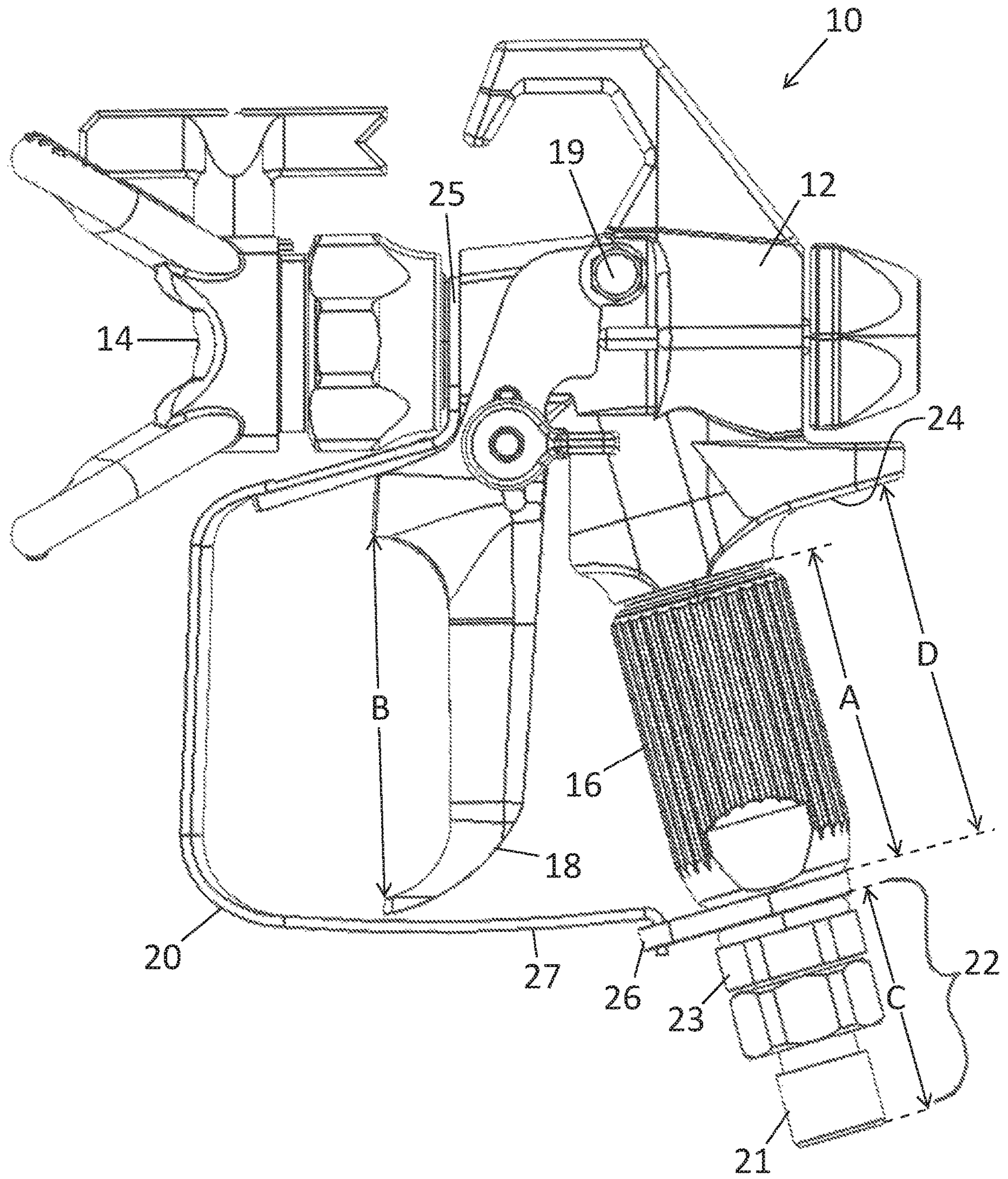
FIG. 4 is a detailed side view of the gun.

FIG. 4 is a side view of the gun 10 showing dimensional ranges. Various embodiments of the gun 10 can include the following indicated dimensions. Dimension A is the length of the handle 16 and can be in the range of 1.25-2.25 inches, or less than 2.5 inches in some embodiments. Dimension A can measure the extent of grip texture along the handle 16 and/or the length of the tube that forms the handle 16. Dimension B is the length of the portion of the trigger 18 which can accommodate the index and middle fingers. Dimension B can be length of the concave or indented portion along the trigger 18. Dimension B can be in the range of 2.0-2.5 inches, or less than 2.3 inches (but greater than zero) in some embodiments. In this way, dimension B does not follow the contour of the concave or indented portion of the trigger 18, but rather the vertical distance from one edge of the top of the concave or indented portion to the bottom edge of the concave or indented portion. Dimension C is the length of the connector 22 from the bottom of the retainer 26 (or guard 20) and can be in the range of 0.1-1.3 inches, or less than 1.5 inches but greater than zero in some embodiments. Dimension C can be the distance from the bottom of the retainer 26 to the bottom end of the connector 22. Dimension D is the length from the bottom of the stop 24 to the bottom of the handle 16 (e.g., aligned with the top side of the retainer 26 and/or top side of the bottom end 27 of the guard 20) and can be in the range of 1.5-2.5 inches, or 0.1-2.5 inches in some embodiments. It is noted that dimensions A and D are expressed as vertical dimension measured vertically along the gun 10. It is noted that these dimensional ranges are examples and the scope of this disclosure is not necessarily limited to these ranges.

Figure 5:
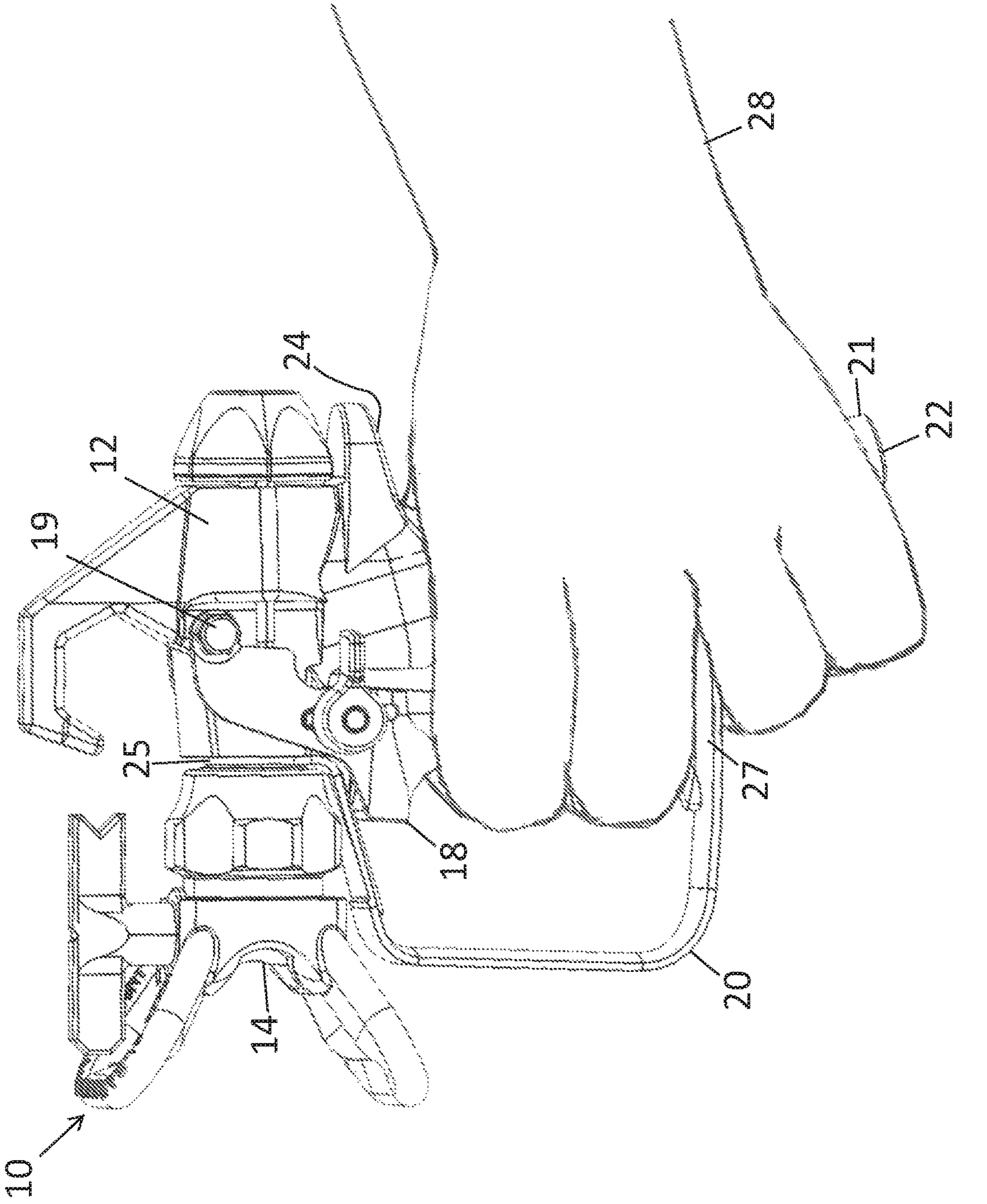
FIG. 5 shows the gun of being held by a hand.

FIG. 5 shows the gun 10 being gripped by a hand 28 in a manner of use. Generally, the gun 10 is configured so that only the index and middle fingers as well as the thump wrap around the handle 16 to operate the gun 10. The ring and little fingers are not accommodated (e.g., vertically) within the guard 20, on the trigger 18, and/or on the handle 16. Instead, the ring and middle fingers may wrap around the connector 22 (if present) and possibly the hose 8 but in either case below the bottoms of the guard 20 and the handle 16. As shown, the bottom end of the guard 27 separates the middle and ring fingers which go above and below, respectively, the bottom end of the guard 27. The bottom end of the guard 27 extends between the middle and ring fingers, and can further contact these two fingers when the gun 10 is gripped.

The length of the trigger 18, or at least the vertical length of the concave or indented portion of the trigger 18, only accommodates two fingers (e.g., the index and middle fingers) of the hand 28 to wrap around and actuate. Likewise, the length of the handle 16 (within the guard 20) is appropriate only for the thump to wrap around on one side (left of right) of the handle 16 while two fingers (e.g., index and middle fingers) wrap around the other side (the other of left or right) of the handle 16 as the palm engages the handle 16. As shown, the ring and small fingers are below the guard 20, substantially or entirely off the handle 16, and wrap around the connector 22 and do not wrap around the handle 16 to the trigger 18. The ring and small fingers are not accommodated on the handle 16 due to the limited length of the handle 16 and the space within the guard 20. The vertical space within the guard 20 may only allow two fingers (e.g., the index and middle fingers) of the hand 28 to be within the guard 20 space and thereby able to actuate the trigger 18. The ring and little fingers are not accommodated within the guard 20, on the trigger 18, and/or on the handle 16. In some embodiments, the guard 20, trigger 18, and handle 16 may be dimensioned even smaller to only allow the thump to wrap around on one side (left of right) while one finger (e.g., the index finger) wraps around the other side (the other of left or right) such that the index, ring, and small fingers are below the guard 20 and wrap around the connector 22 and do not wrap around the handle 16.

As previously mentioned, the gun 10 is used for painting and as such the user will frequently make sweeps, turns, and other motions with the gun 10 by the one hand 28 holding the gun 10. Many such motions are articulated by the wrist. Such motions may be made while the user's arm is contorted, particularly in confined spaces. The small profile of the gun 10 makes the gun 10 easier to maneuver and aim, particularly for wrist movements. The gun 10 is also lighter weight as compared to large conventional design which also contributes to reduced user fatigue. The reduced size of the gun 10 facilitates compact storage.

Figure 6B:
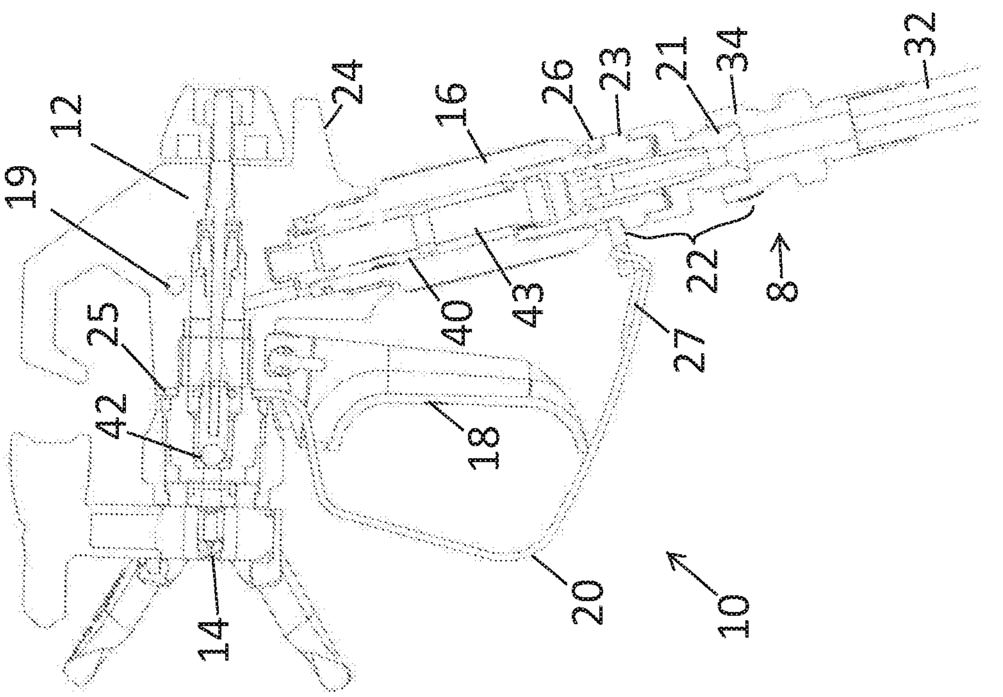
FIGS. 6A-B show the gun in profile and cross section, respectively, with a hose supplying paint under high pressure.
Figure 6A:
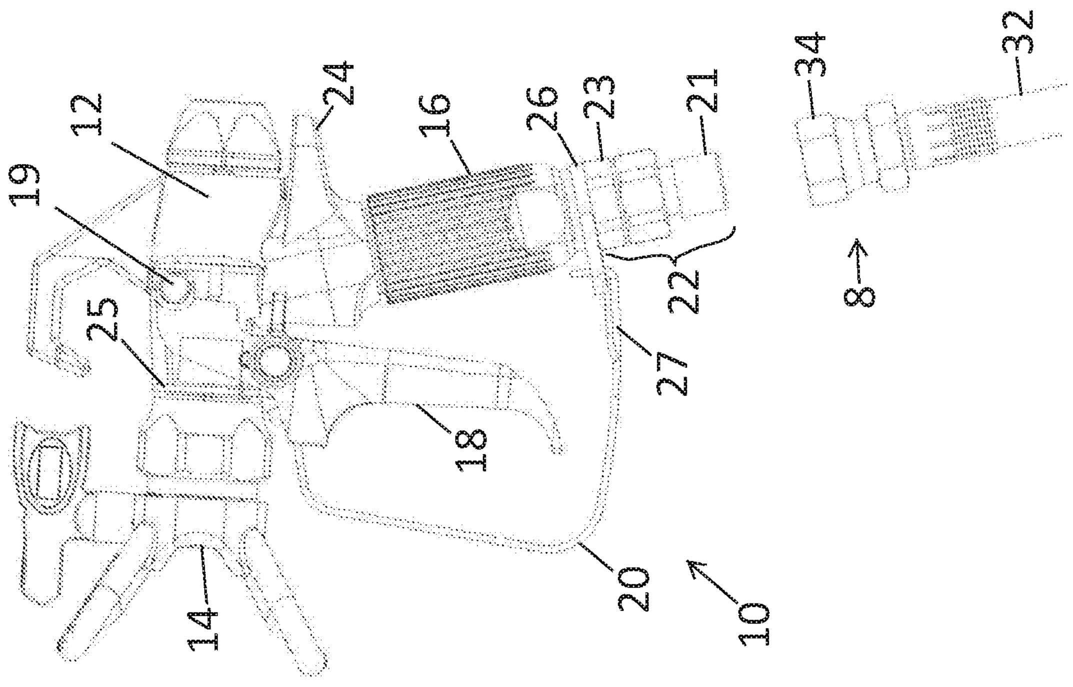

FIG. 6A show a side view of the gun 10 while FIG. 6B shows a similar view but in cross section. These views show the hose 8 that is connected with the gun 10 to feed paint under pressure to the gun 10. The hose 8 is not connected to the gun 10 in FIG. 6A but is connected in FIG. 6B via the connector 22. The hose 8 includes a flexible tube 32 formed from rubber and/or other flexible and strong material. The hose 8 includes a fitting 34 having a hex nut which can receive a threaded end of the fitting 21 of the connector 22.

The view of FIG. 6B shows that the retainer 26 wraps entirely around the coupling 23 in the manner of the ring. The coupling 23 extends into both of the handle 16 and fitting 22 to form respective threaded interfaces with each. The coupling 23 is an elongated metal piece having a channel that extends therethrough. The handle 16 defines an interior passage 40 which extends the full length of the elongate tubular handle 16. The passage 40 transports paint through to handle 14 into the body 12. The trigger 18 is linked to, and actuates, the valve 42 that is located within the body 12. The valve 42 comprises a ball and seat (or a needle and seat). The trigger 18 is actuated by pulling the trigger 18 rearwards which opens the valve 42 to allow paint supplied under pressure to the body 12 to be released through the nozzle 14 as a spray. Releasing the trigger 18 closes the valve 42 to stop the flow of paint through the body 12 to stop spraying paint from the nozzle 14.

As paint flows through the gun 10, the paint contacts the inner surface of the handle 14 that defines the passage 40 when flowing through the handle 14. The passage 40 includes a filter 43 through which paint can pass within the handle 16. As shown, the top end of the handle 16 is received within a hole in the body 12. A threaded interface can couple the handle 16 to the body 16. The handle 16 extends the full length between the body 12 and the retainer 26 of the guard 20.

Figure 7B:
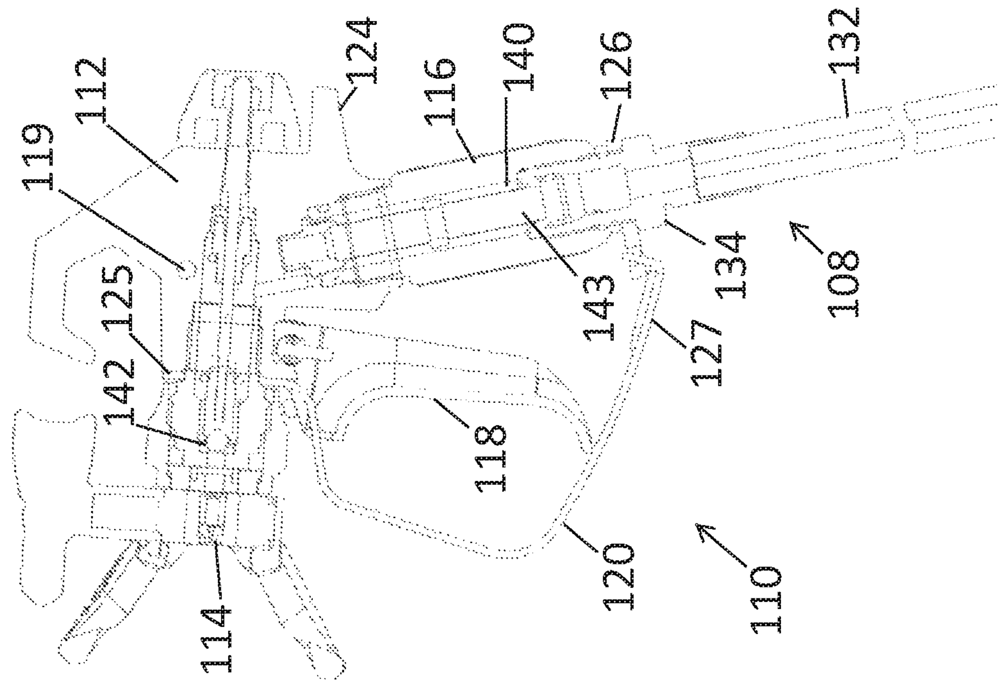
FIGS. 7A-B show an alternative gun in profile and cross section, respectively, with a hose supplying paint under high pressure.
Figure 7A:
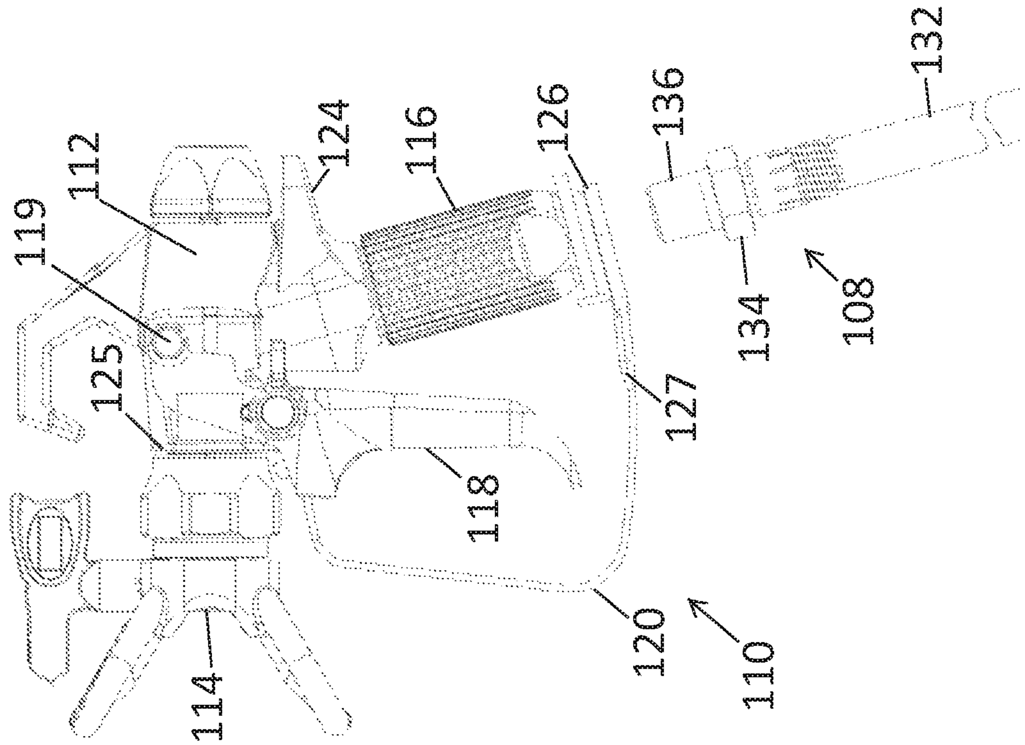

FIG. 7A show a side view of a gun 110 while FIG. 7B shows a similar view but in cross section. The gun 110 is identical to the gun 10 except as shown or described. Components sharing the first two digits of a reference numbers (e.g., 10, 110, etc.) of different embodiments can have similar configurations amongst the various illustrated and described embodiments unless otherwise noted or incompatible. For the sake of brevity, the description of common aspects (e.g., materials, features, functions, properties, etc.) are not repeated for different components having similar reference numbers.

The gun 110 includes a body 112, a nozzle 114, a handle 116, a stop 124, a trigger 118, a hinge 119, a guard 120 having a top end 125 and a bottom end 127, a retainer 126, and a valve 142. The handle 116 defines an interior passage 140 which extends the full length of the elongate tubular handle 116. The passage 140 transports paint through the handle 114 to the body 112. The passage 140 includes a filter 143 through which paint can pass within the handle 116.

The gun 110 can be identical to the gun 10 except that the gun 110 does not include connector 22 below the retainer 126 and/or the guard 120. Instead, a threaded end 136 of the fitting 134 of a hose 108 is received within a hole on the bottom side of the handle 114 having complementary threading. The hose include flexible tube 132 and fitting 134. The fitting 134 in this embodiment includes a hex nut portion that can contact the bottom of the retainer 126 and/or guard 120. The retainer 126 has a hole through which the threaded end 136 can pass into the handle 116. Thus, the gun 110 does not include any components below the retainer 126 and/or guard 120. The gun 110 is particularly compact due to the fitting 134 being inserted into the handle 116. When gripped, the ring and little fingers would wrap around the hose 108 while the palm, thump, index, and middle fingers would wrap around the handle 116.

The present disclosure is made using an embodiment to highlight various inventive aspects. Modifications can be made to the embodiment presented herein without departing from the scope of the invention. As such, the scope of the invention is not limited to the embodiment disclosed herein.

The following is claimed:

1. A method of handling a gun for spraying paint with a single hand, the paint supplied to the gun from a hose under pressure, the hose having a fitting, the method comprising:

gripping the gun by interfacing with an exterior of a handle of the gun and interfacing with an exterior of a fitting connector of the gun, the fitting connector formed separately from the handle, the gun comprising:

a body comprising a valve;

a trigger actuatable to open and close the valve, wherein a front side of the trigger is configured to be engaged by at least one finger of the single hand gripping the gun;

a stem extending downwards from the body, the stem comprising the handle and the fitting connector extending upwards into the handle to connect to the handle, the fitting connector extending downwards from the handle such that the exterior of the handle and the exterior of the fitting connector are exposed, the fitting connector having threading, the fitting connector configured to interface with the fitting of the hose to threadedly connect the gun to the hose, wherein the fitting connector is configured to mechanically connect the hose to the gun and to fluidly connect a flowpath within the hose to a flowpath within the handle such that the paint exits the hose and flows within the fitting connector to enter the handle;

a guard having a top end and a bottom end, the top end attached to the body, the bottom end attached to the stem below the trigger such that the fitting connector extends downward below the guard and below the handle, the trigger located directly between the guard and the handle;

wherein gripping the gun comprises grasping the exterior of the handle above the bottom end of the guard, contacting the front side of the trigger at a location above the bottom end of the guard, and contacting the exterior of the fitting connector at a location below the bottom end of the guard; and actuating, while gripping the gun, the trigger by engaging the front side of the trigger and pulling the trigger, the trigger being depressed with the fitting connector engaged at the location below the bottom end of the guard such that the gun is supported by the grasping of the exterior of the handle above the bottom end of the guard and the contacting with the exterior of the fitting connector below the bottom end of the guard, the actuation of the trigger opening the valve to allow release of the paint as a spray;

wherein the handle is configured to be gripped by the single hand such that a thumb of the one hand wraps around one side of the handle, at least one finger of the one hand wraps around the other side of the handle above the bottom end of the guard to contact the trigger, and at least one other finger of the one hand wraps around and contacts the exterior of the fitting connector below the bottom end of the guard.

2. The method of claim 1, wherein the gun is configured such that the at least one finger wrapping around the other side of the handle above the bottom end of the guard to contact the trigger comprises two fingers wrapping around the other side of the handle above the bottom end of the guard to contact the trigger.

3. The method of claim 1, wherein the handle is a metal tube having a conduit through which the paint flows to the body.

4. The method of claim 1, further comprising a retainer located on the stem below the handle, the bottom end of the guard attached to the retainer by a hook attachment.

5. The method of claim 1, wherein the fitting connector comprises a swivel below the bottom end of the guard, the swivel permitting rotation between the hose and the gun, wherein the gun is configured such that the at least one other finger wraps around and contacts the swivel below the bottom end of the guard.

6. The method of claim 1, wherein the guard comprises a retainer attached to the stem by wrapping around the stem, wherein the bottom end of the guard is attached to the stem by the retainer.

7. The method of claim 1, wherein actuating, while gripping the gun, the trigger comprises contacting an indented portion of the trigger.

8. The method of claim 7, wherein the indented portion has a vertical length along the trigger of between 2.0-2.5 inches.

9. The method of claim 1, wherein the gun further comprises a stop on the rear side of the body.

10. The method of claim 9, wherein the vertical distance from the bottom of the stop to the bottom of the handle is 2.5 inches or less.

11. A method of handling a gun for spraying paint with a single hand, the paint supplied to the gun from a hose under pressure, the hose having a fitting, the method comprising:

gripping the gun by interfacing with an exterior of a handle of the gun and interfacing with an exterior of a fitting connector of the gun, the fitting connector formed separately from the handle, wherein the exterior of the handle has a first length and the exterior of the fitting connector has a second length, the gun comprising:

a body comprising a valve;

a trigger actuatable to open and close the valve, wherein a front side of the trigger is configured to be engaged by at least one finger of the single hand gripping the gun;

a stem extending downwards from the body and having a stem length, the stem comprising the handle and the fitting connector extending upwards into the handle to connect to the handle, the fitting connector extending downwards from the handle such that the exterior of the handle and the exterior of the fitting connector are exposed, the fitting connector having threading, the fitting connector configured to interface with the fitting of the hose to threadedly connect the gun to the hose, wherein the fitting connector is configured to mechanically connect the hose to the gun and to fluidly connect a flowpath within the hose to a flowpath within the handle such that the paint exits the hose and flows within the fitting connector to enter the handle, wherein the stem length is formed by the first length and the second length and the second length forms at least three eighths of the stem length;

a guard having a top end and a bottom end, the top end attached to the body, the bottom end attached to the stem below the trigger such that the fitting connector extends downward below the guard and below the handle, the trigger located directly between the guard and the handle;

wherein gripping the gun comprises grasping the exterior of the handle above the bottom end of the guard, contacting the front side of the trigger at a location above the bottom end of the guard, and contacting the exterior of the fitting connector at a location below the bottom end of the guard; and actuating, while gripping the gun, the trigger by engaging the front side of the trigger and pulling the trigger, the trigger being depressed with the fitting connector engaged at the location below the bottom end of the guard such that the gun is supported by the grasping of the exterior of the handle above the bottom end of the guard and the contacting with the exterior of the fitting connector below the bottom end of the guard, the actuation of the trigger opening the valve to allow release of the paint as a spray;

wherein the handle is configured to be gripped by the single hand such that a thumb of the one hand wraps around one side of the handle, at least one finger of the one hand wraps around the other side of the handle above the bottom end of the guard to contact the trigger, and at least one other finger of the one hand wraps around and contacts the exterior of the fitting connector below the bottom end of the guard.

* * * * *